(12) United States Patent
Koizumi et al.

(10) Patent No.: US 11,339,944 B2
(45) Date of Patent: May 24, 2022

(54) VEHICLE LAMP

(71) Applicant: KOITO MANUFACTURING CO., LTD., Tokyo (JP)

(72) Inventors: Miki Koizumi, Shizuoka (JP); Kyouhei Akiyama, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/287,089

(22) PCT Filed: Oct. 16, 2019

(86) PCT No.: PCT/JP2019/040691
§ 371 (c)(1),
(2) Date: Apr. 20, 2021

(87) PCT Pub. No.: WO2020/090476
PCT Pub. Date: May 7, 2020

(65) Prior Publication Data
US 2021/0381672 A1 Dec. 9, 2021

(30) Foreign Application Priority Data
Nov. 2, 2018 (JP) .............................. JP2018-207322

(51) Int. Cl.
*F21S 43/20* (2018.01)
*F21S 43/245* (2018.01)
(Continued)

(52) U.S. Cl.
CPC ............ *F21S 43/26* (2018.01); *B60Q 1/0041* (2013.01); *B60Q 3/64* (2017.02); *F21S 43/237* (2018.01); *F21S 43/245* (2018.01)

(58) Field of Classification Search
CPC ........ F21S 43/26; F21S 43/237; F21S 43/245; B60Q 3/64; B60Q 1/0041; B60Q 3/62
(Continued)

(56) References Cited

U.S. PATENT DOCUMENTS

| 2013/0201709 A1 | 8/2013 | Natsume | |
|---|---|---|---|
| 2013/0242603 A1* | 9/2013 | Pfeil | ........................ B60Q 3/78 |
| | | | 362/606 |

(Continued)

FOREIGN PATENT DOCUMENTS

| CN | 206669641 U | * 11/2017 | ............. F21S 43/27 |
|---|---|---|---|
| CN | 110360519 A | * 10/2019 | ............. F21S 41/24 |

(Continued)

OTHER PUBLICATIONS

Search translation of CN110360519; pp. 1-9 (Year: 2021).*
International Search Report dated Nov. 19, 2019 for WO 2020/090476 A1 (4 pages).

*Primary Examiner* — Laura K Tso
(74) *Attorney, Agent, or Firm* — Abelman, Frayne & Schwab

(57) ABSTRACT

A vehicle lamp includes: a first light guide including a first light guiding portion having a first light emitting surface and a first light incident surface; a second light guide including a second light guiding portion having a second light emitting surface and a second light incident surface; and a first reflector configured to reflect a part of light emitted from the first light emitting surface. The first light guiding portion and the second light guiding portion are disposed on opposite sides across the first reflector, the first light guiding portion is positioned on a light emitting direction side of the second light guiding portion, and a part of the second light guiding portion is positioned outside the first light guiding portion in the light guide direction.

5 Claims, 7 Drawing Sheets

(51) Int. Cl.
*F21S 43/237* (2018.01)
*B60Q 3/64* (2017.01)
*B60Q 1/00* (2006.01)

(58) Field of Classification Search
USPC .................................................. 362/488, 511
See application file for complete search history.

(56) References Cited

U.S. PATENT DOCUMENTS

| | | | |
|---|---|---|---|
| 2018/0210127 | A1 | 7/2018 | Akiyama |
| 2020/0003383 | A1* | 1/2020 | Takenaga .............. F21S 43/249 |

FOREIGN PATENT DOCUMENTS

| | | |
|---|---|---|
| DE | 102006059980 A | 6/2008 |
| DE | 102017111805 A1 | 12/2017 |
| EP | 2327585 A1 | 6/2011 |
| EP | 3118060 A1 | 1/2017 |
| EP | 3531404 A1 | 8/2019 |
| FR | 3047295 A1 | 8/2017 |
| JP | 2009-099458 A | 5/2009 |
| JP | 2013-187176 A | 9/2013 |
| JP | 2013-206875 A | 10/2013 |
| JP | 2015-204275 A1 | 11/2015 |
| JP | 2016-119283 A | 6/2016 |
| JP | 2017-004679 A | 1/2017 |
| JP | 2017-147105 A1 | 8/2017 |
| JP | 2017-534163 A | 11/2017 |

* cited by examiner

VEHICLE LAMP

CROSS REFERENCE TO RELATED APPLICATIONS

This application is a national phase of PCT application No. PCT/JP2019/040691, filed on 16 Oct. 2019, which claims priority from Japanese patent application No. 2018-207322, filed on 2 Nov. 2018, all of which are incorporated herein by reference.

TECHNICAL FIELD

The present disclosure relates to a technical field of a vehicle lamp including a light guide that guides light incident from an incident surface.

BACKGROUND

There is a type of vehicle lamp where a light source and a light guide are disposed in a lamp outer case constituted by a cover and a lamp housing, and light emitted from the light source is guided by the light guide and irradiated from an emitting surface of the light guide toward the outside.

In a light guide, generally, a light guiding portion is formed in a shape extending in a predetermined direction to guide light (see, e.g., Patent Document 1). A light source is disposed at a position facing an incident surface of the light guide, light emitted from the light source is incident from an incident surface, and the incident light is internally reflected (totally reflected) by a total reflection step and is guided in the light guiding portion, and at least a part of the internally reflected light is emitted from an emitting surface.

Such a light guide is formed in various shapes depending on the shape of a vehicle or a vehicle lamp. In the vehicle lamp disclosed in Patent Document 1, two light guides are disposed inside a lamp outer case, and the light guide portions in the two light guides are intersecting with each other.

PRIOR ART DOCUMENT

Patent Document

Patent Document 1: Japanese Laid-Open Patent Publication No. 2013-206875

SUMMARY OF THE INVENTION

Problem to be Solved

Recently, the types of vehicle lamps have been increased and the functions have been improved, and also in the vehicle lamp having the light guide as described above, it is required to improve functionality according to the type of the vehicle lamp and it is necessary to diversify the light irradiation state.

Therefore, the vehicle lamp according to the present disclosure is to promote the improvement of functionality by diversifying the light irradiation state.

Means to Solve the Problem

First, a vehicle lamp according to the present disclosure includes: a first light guide including a first light guiding portion having a first light emitting surface formed thereon and a first light incident surface formed at at least one end in a light guide direction; a second light guide including a second light guiding portion having a second light emitting surface formed thereon and a second light incident surface formed at at least one end in a light guide direction; and a first reflector configured to reflect a part of light emitted from the first light emitting surface. The first light guiding portion and the second light guiding portion are disposed on opposite sides across the first reflector, the first light guiding portion is positioned on a light emitting direction side of the second light guiding portion, and a part of the second light guiding portion is positioned outside the first light guiding portion in the light guide direction.

Therefore, the first light guiding portion and the second light guiding portion are disposed on the opposite sides across the first reflector, and a part of the second light guiding portion is positioned outside the first light guiding portion in the light guide direction.

Second, in the vehicle lamp according to the present disclosure, a second reflector may be provided to reflect a part of light emitted from the second light emitting surface.

Therefore, a part of the light guided in the second light guiding portion is reflected by the second reflector.

Third, in the vehicle lamp according to the present disclosure, a first light source may be disposed to face the first light incident surface, a second light source may be disposed to face the second light incident surface, and the first light source and the second light source may be mounted on the same circuit board.

Therefore, since both the first light source and the second light source that emit light incident to the different light incident surfaces are mounted on one circuit board, it is not required to provide a separate circuit board on which each of the first light sources and the second light sources is mounted.

Fourth, in the vehicle lamp according to the present disclosure, the first light guide may be provided with an engagement protrusion protruding from the first light guiding portion and engaged with a part of the first reflector, and the engagement protrusion may protrude from a position other than the first light emitting surface.

Therefore, since the engagement protrusion is engaged with a part of the first reflector, the first light guide is held by the first reflector, and the light emitted from the first light emitting surface is not directed to the engagement protrusion, so that the engagement protrusion does not interfere with the progress of the light emitted from the first light emitting surface.

Fifth, the vehicle lamp according to the present disclosure, the engagement protrusion may protrude from one end portion of the first light guiding portion in the light guide direction.

Therefore, the engagement protrusion protruding from the one end portion of the first light guide portion in the longitudinal direction is engaged with a part of the first reflector.

Effect of the Invention

According to the present disclosure, the first light guiding portion and the second light guiding portion are disposed on the opposite sides across the first reflector in a state where the first light guiding portion is positioned on the light emitting direction side of the second light guiding portion, and a part of the second light guiding portion is positioned outside the first light guiding portion in the light guide direction. As a result, it is possible to separately control the light emitted from the first light emitting surface and the light emitted from the second light emitting surface to be continuously or intermittently irradiate, and to promote the improvement of the functionality by the diversification of the light irradiation state.

DETAILED DESCRIPTION TO EXECUTE THE INVENTION

Hereinafter, an embodiment for implementing a vehicle lamp of the present disclosure will be described with reference to the accompanying drawings.

A vehicle lamp 1 is attached to a predetermined position such as, for example, a front end portion, a rear end portion, a side surface portion, or a ceiling surface portion. In the following, front-back, upward-downward, and left-right directions will be described with a light emitting direction from the vehicle lamp 1 as the front. However, the front-rear, upward-downward, and left-right directions illustrated in the following are for convenience of explanation, and the practice of the present disclosure is not limited to these directions.

Figure 1:
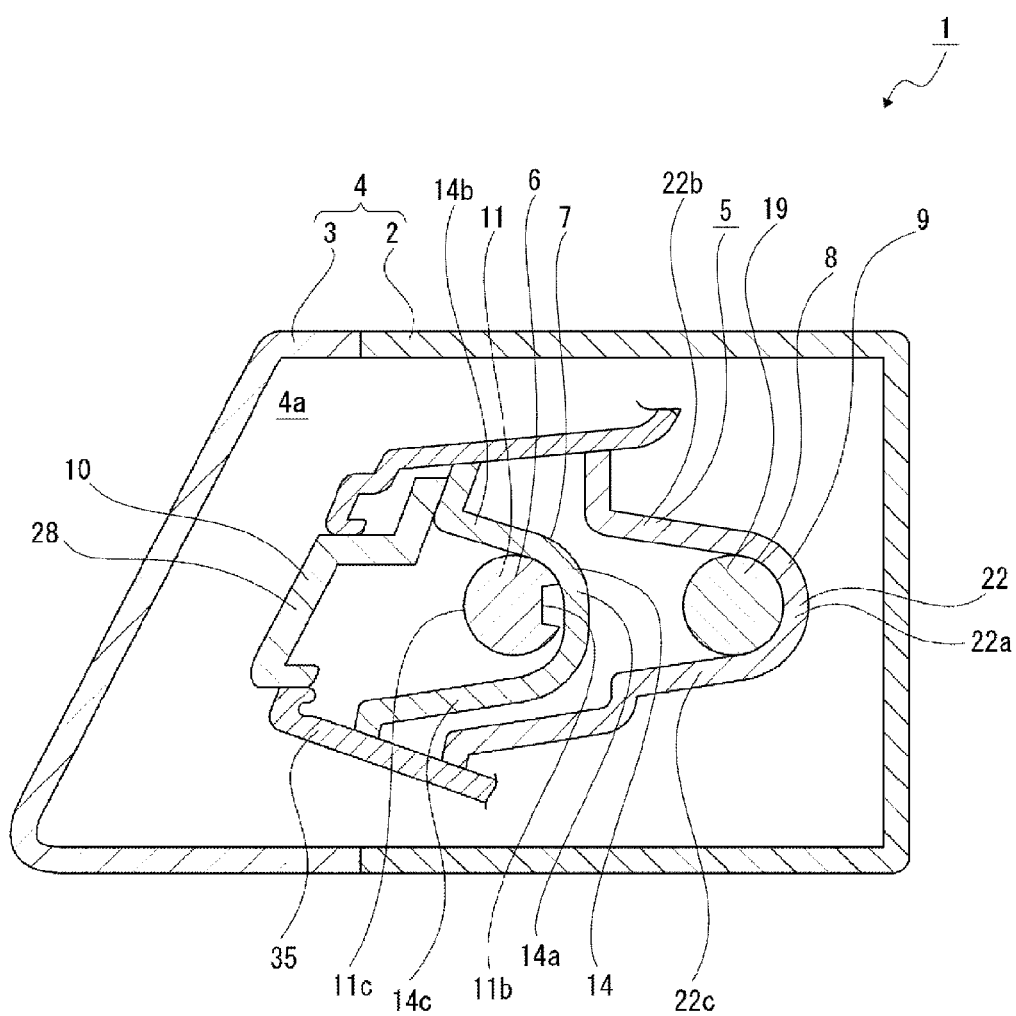
FIG. 1 illustrates an embodiment of a vehicle lamp of the present disclosure together with FIGS. 2 to 10, and is a schematic cross-sectional view of the vehicle lamp.

The vehicle lamp 1 includes a lamp housing 2 that is opened frontward and a cover 3 that closes an opening of the lamp housing 2 (see FIG. 1). A lamp outer case 4 is constituted by the lamp housing 2 and the cover 3, and the internal space of the lamp outer case 4 is formed as a lamp chamber 4a.

A lamp unit 5 is accommodated in the lamp chamber 4a. The lamp unit 5 includes a first light guide 6, a first reflector 7, a second light guide 8, a second reflector 9, and an inner lens 10 (see FIGS. 1 to 3).

The first light guide 6 is made of a transparent material such as resin or glass, and has a first light guiding portion 11, a first attached portion 12, and engagement protrusions 13 and 13. The first light guiding portion 11, the first attached portion 12, and the engagement protrusions 13 and 13 are integrally formed.

The first light guiding portion 11 is formed, for example, in a substantially circular shaft shape extending in a substantially left-right direction, and the extending direction is a light guide direction that guides light. One end surface of the first light guiding portion 11 in the light guide direction is formed as a first light incident surface 11a. A first reflecting surface 11b is formed on a rear surface side of the first light guiding portion 11, and the first reflecting surface 11b becomes a light control step having an unevenness shape continuous in the light guide direction (see FIG. 4). A first light emitting surface 11c is formed on a front surface side of the first light guiding portion 11, and the first light emitting surface 11c is formed, for example, in an arc surface shape that is convex frontward.

Figure 2:
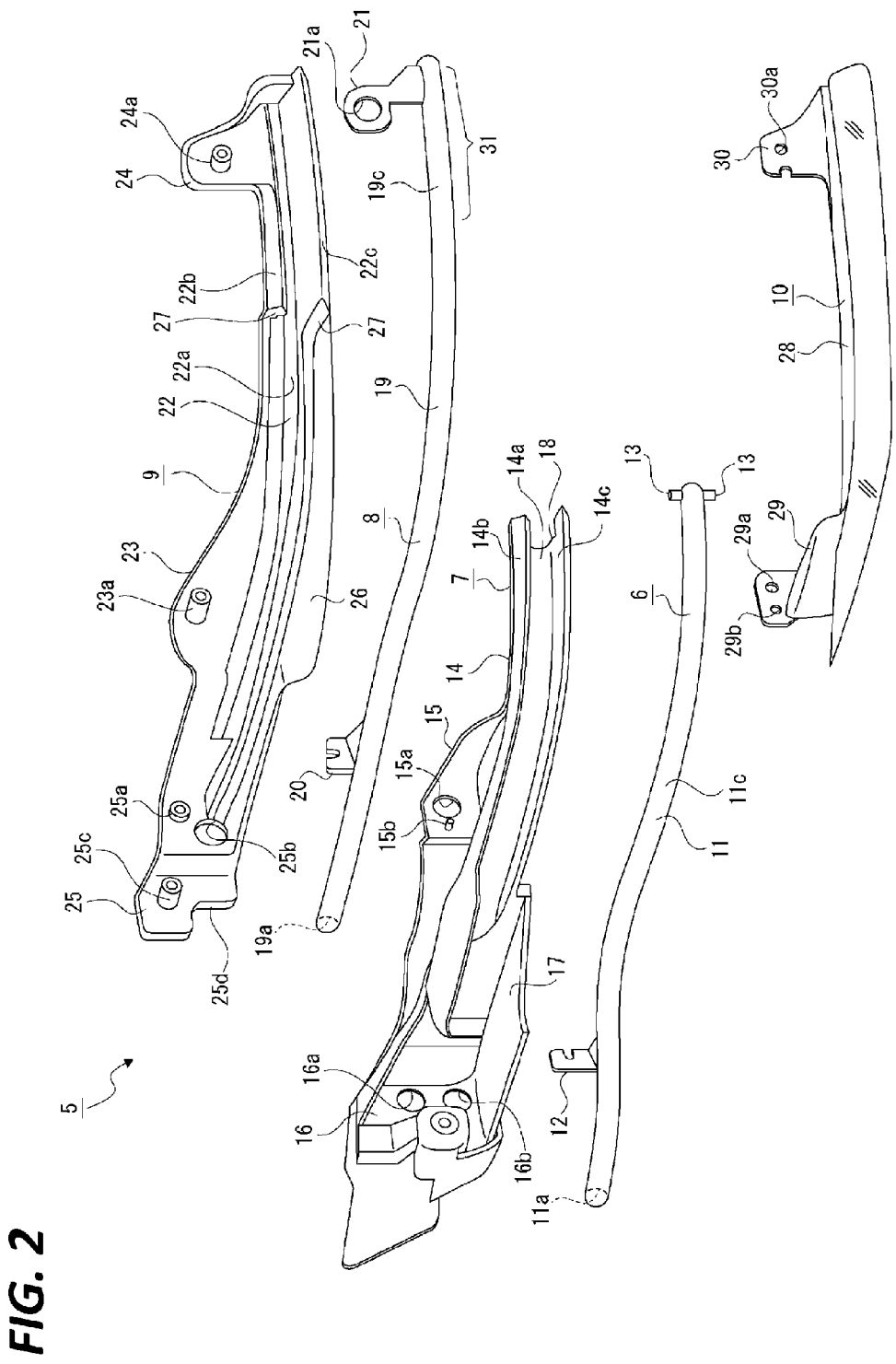
FIG. 2 is an exploded perspective view of a lamp unit.
Figure 3:
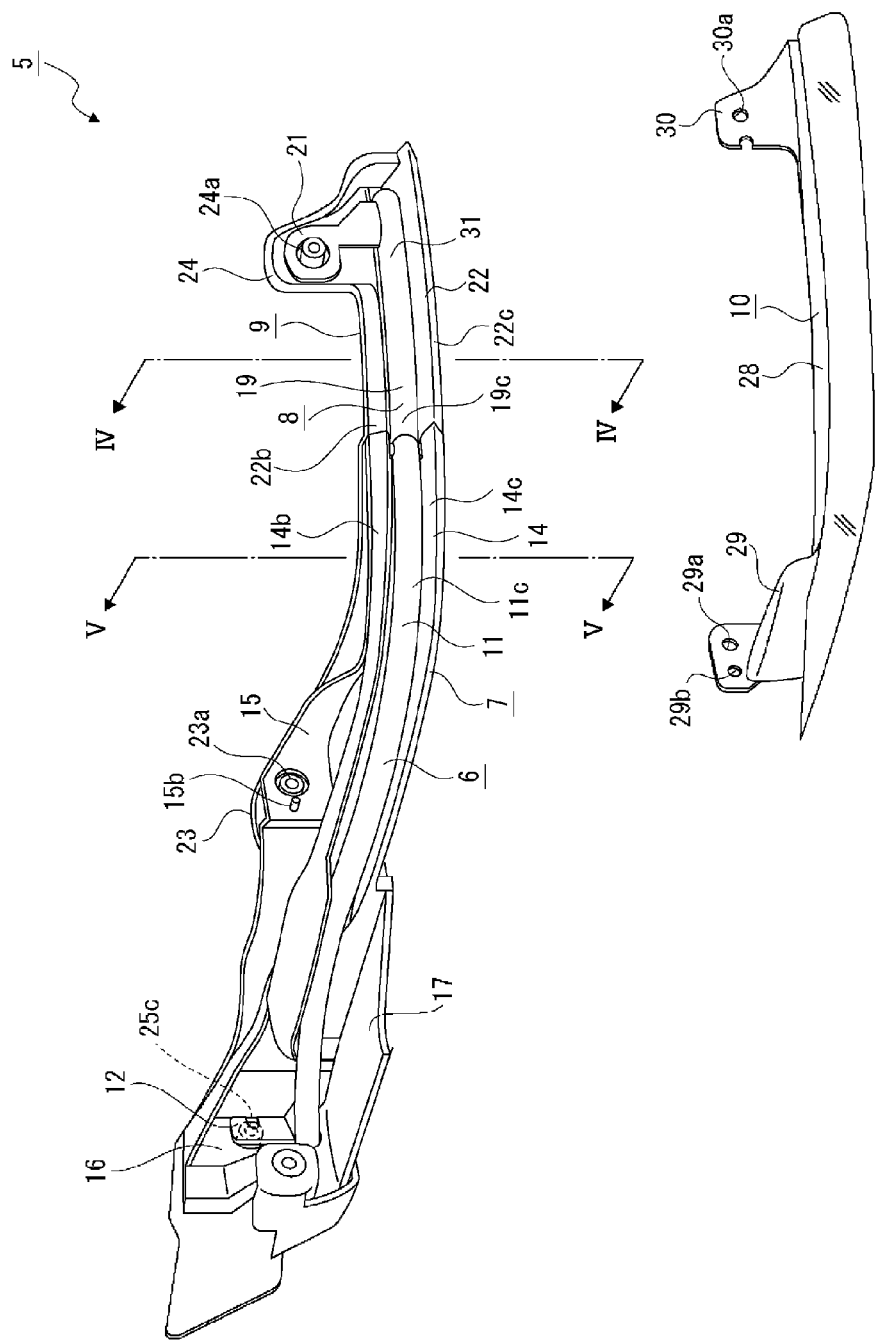
FIG. 3 is a perspective view illustrating a part of the lamp unit separated.

The first attached portion 12 protrudes upward from the first light guiding portion 11, and is provided a portion near the first light incident surface 11a (see FIGS. 2 and 3).

Figure 6:
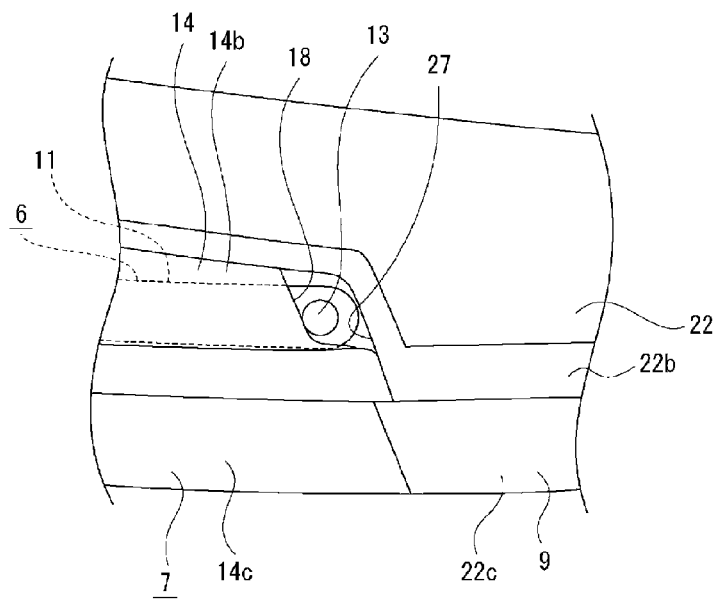
FIG. 6 is an enlarged plan view illustrating a state where an engagement protrusion is engaged with a part of a first reflector.
Figure 7:
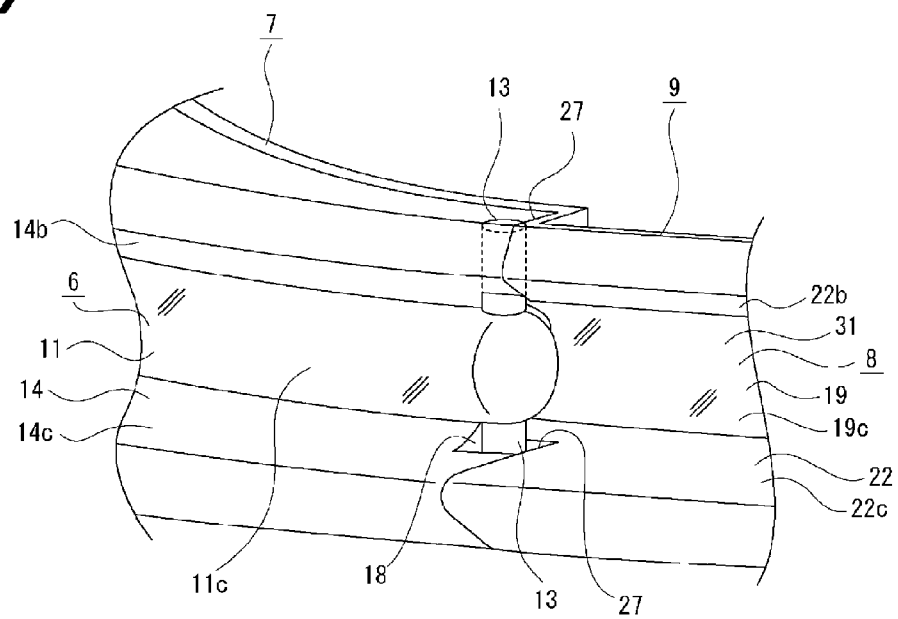
FIG. 7 is an enlarged perspective view illustrating the state where the engagement protrusion is engaged with the part of the first reflector.

The engagement protrusions 13 and 13 respectively protrude upward and downward from the other end portion of the first light guiding portion 11, and are formed, for example, in a circular shaft shape (see FIGS. 2, 6, and 7). The engagement protrusions 13 and 13 protrude from the upper surface and the lower surface of the first light guiding portion 11, respectively. Therefore, the engagement protrusions 13 and 13 protrude from a position other than the first light emitting surface 11c.

Figure 4:
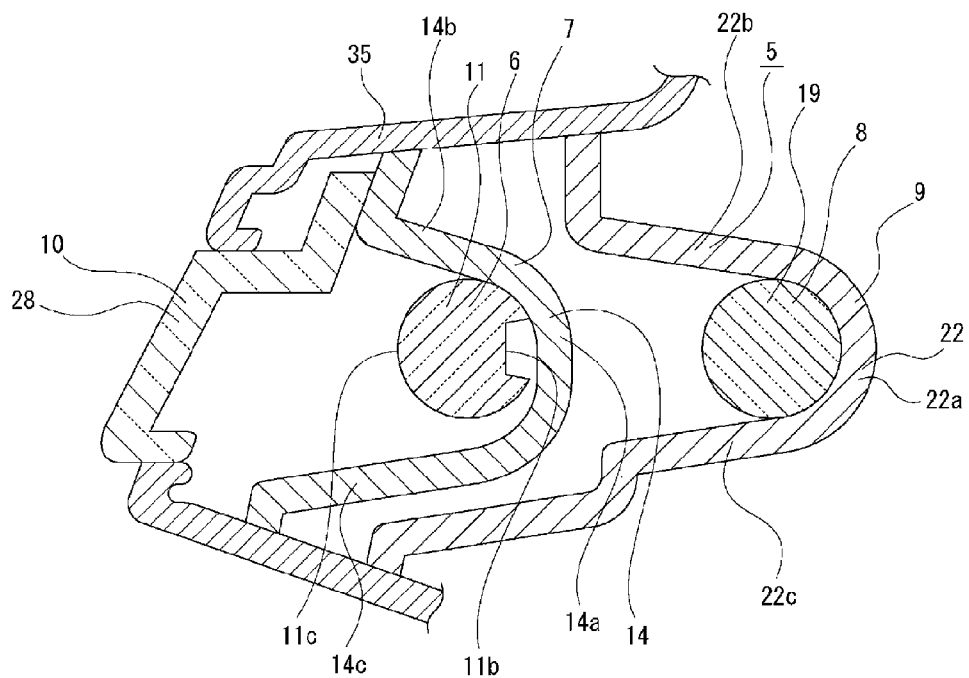
FIG. 4 is a cross-sectional view illustrating a cross section taken along the line IV-IV in FIG. 3 with an inner lens added.

As illustrated in FIGS. 2 to 4, the first reflector 7 includes a first insertion arrangement portion 14 into which the first light guiding portion 11 is inserted, a first upper surface portion 15 that protrudes upward from an upper end of the first insertion arrangement portion 14, a first side surface portion 16 that protrudes frontward from one end of the first insertion arrangement portion 14 in the left-right direction, and a first lower surface portion 17 that protrudes frontward from a lower end of the first insertion arrangement portion 14.

The first insertion arrangement portion 14 includes a concave shape portion 14a having a substantially semi-arc shape opened frontward, an upper inclined surface portion 14b that protrudes upward obliquely from an upper end portion of the concave shape portion 14a, and a lower inclined surface portion 14c that protrudes downward obliquely from a lower end portion of the concave shape portion 14a. Engagement notches 18 and 18 are formed in an end portion on a side opposite to the side of the insertion arrangement portion 14 on which the first side surface portion 16 is provided (see FIGS. 6 and 7). The engagement notches 18 and 18 are formed in the upper inclined surface portion 14b and the lower inclined surface portion 14c, respectively, and are opened rearward and laterally. An upper surface (inner surface) of the lower inclined surface portion 14c functions as a reflection control surface that reflects a part of light emitted from the first light guide 6 toward a predetermined direction.

An insertion penetrating hole 15a is formed in the first upper surface portion 15. The first upper surface portion 15 is provided with a positioning pin 15b that protrudes frontward along with the insertion penetrating hole 15a. An insertion penetrating hole 16a and an insertion hole 16b are formed in the first side surface portion 16 side by side vertically.

The second light guide 8 is made of a transparent material such as resin or glass, and has a second light guiding portion 19 and second attached portions 20 and 21 (see FIG. 2). The second light guiding portion 19 and the second attached portions 20 and 21 are integrally formed.

The second light guiding portion 19 is formed, for example, in a substantially circular shaft shape extending in a substantially left-right direction, and the extending direction is a light guide direction that guides light. The second light guiding portion 19 has a length longer than that of the first light guiding portion 11. One end surface of the second light guiding portion 19 in the light guide direction is formed as a second light incident surface 19a. A second reflecting surface 19b is formed on a rear surface side of the second light guiding portion 19, and the second reflecting surface 19b becomes a light control step having an unevenness shape continuous in the light guide direction (see FIG. 5). A second light emitting surface 19c is formed on a front surface side of the second light guiding portion 19, and the second light emitting surface 19c is formed, for example, in an arc surface shape that is convex frontward.

The second attached portions 20 and 21 protrude upward from the second light guiding portion 19, respectively. The second attached portion 20 is provided in a portion near the second light incident surface 19a, and the second attached portion 21 is provided on an end portion on a side opposite to the side on which the second light incident surface 19a is formed (see FIG. 2). A positioning hole 21a is formed in the second attached portion 21.

Figure 5:
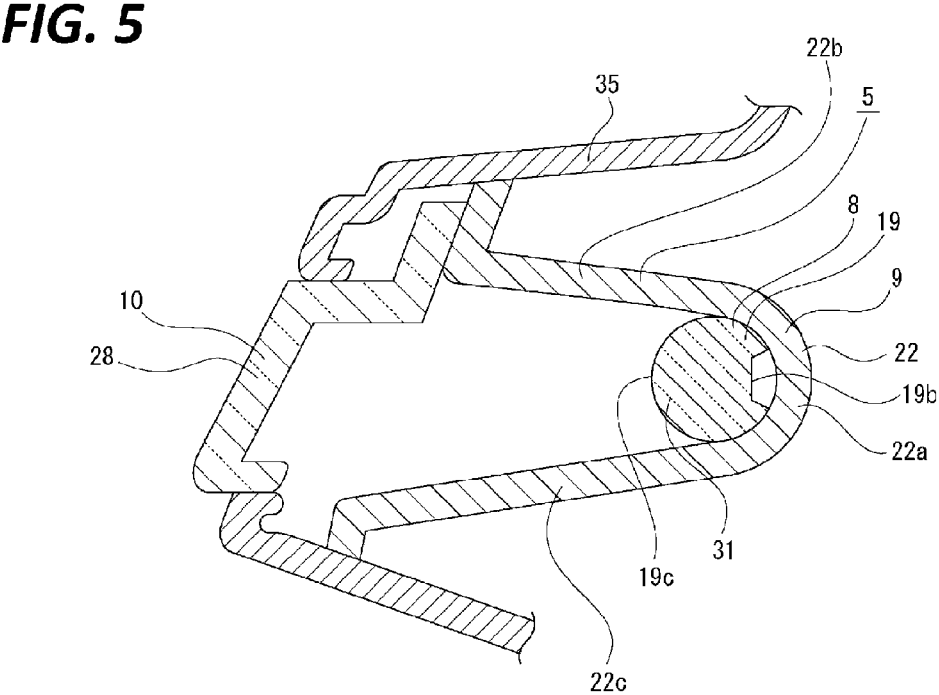
FIG. 5 is a cross-sectional view illustrating a cross section taken along the line V-V in FIG. 3 with the inner lens added.

As illustrated in FIGS. 2, 4, and 5, the second reflector 9 includes a second insertion arrangement portion 22 into which the second light guiding portion 19 is inserted, second upper surface portions 23 and 24 that protrude upward from an upper end of the second insertion arrangement portion 22, a second side surface portion 25 that protrudes frontward from one end of the second insertion arrangement portion 22 in the left-right direction, and a second lower surface portion 26 that protrudes frontward from a lower end of the second insertion arrangement portion 22.

The second insertion arrangement portion 22 includes a concave shape portion 22a having a substantially semi-arc shape opened frontward, an upper inclined surface portion 22b that protrudes upward obliquely from an upper end portion of the concave shape portion 22a, and a lower inclined surface portion 22c that protrudes downward obliquely from a lower end portion of the concave shape portion 22a. An upper surface (inner surface) of the lower inclined surface portion 22c functions as a reflection control surface that reflects a part of light emitted from the second light guide 9 toward a predetermined direction.

The second upper surface portions 23 and 24 are positioned to be separated from each other to the left and right, and the second upper surface portion 24 is positioned in an end portion on a side opposite to the side on which the second side surface portion 25 is provided. An attachment boss 23a that protrudes frontward is provided in the second upper surface portion 23, and a screw hole is formed in the attachment boss 23a. A positioning protrusion 24a that protrudes frontward is provided in the second upper surface portion 24, and a screw hole is formed in the positioning protrusion 24a.

In the second side surface portion 25, an attachment boss 25a having a screw hole is formed in the upper side and an insertion hole 25b is formed in the lower side. In the second side surface portion 25, an attachment boss 25c is provided on the lateral side of the attachment boss 25a, and a screw hole is formed in the attachment boss 25c. In the second side surface portion 25, a relief notch 25d is formed on the lateral side of the insertion hole 25b.

Stepped surfaces 27 and 27 are formed between the second upper surface portion 23 and the second upper surface portion 24 at both upper and lower end portions of the second reflector 9, respectively (see FIGS. 2, 6, and 7). The stepped surfaces 27 and 27 are formed as surfaces directed to the second side surface portion 25 side.

The inner lens 10 includes a transmitting portion 28 extending in the left-right direction and coupling piece portions 29 and 30 respectively protruding upward from the transmitting portion 28, and the transmitting portion 28 and the coupling piece portions 29 and 30 are integrally formed (see FIG. 2). The transmitting portion 28 may be provided with a diffusion step. A screw insertion penetrating hole 29a and a positioning hole 29b are formed in the coupling piece portion 29 side by side in the left-right direction. A screw insertion penetrating hole 30a is formed in the coupling piece portion 30.

The lamp unit 5 configured as described above is configured by attaching each component as follows.

The second light guide 8 is inserted into the second insertion arrangement portion 22 from the front in a state where the end portion of the second light guiding portion 19 on the light incident surface 19a side is inserted into the insertion hole 25b formed in the second side surface portion 25 of the second reflector 9, and the second light guiding portion 19 is positioned on the inner side of the second insertion arrangement portion 22 (see FIGS. 4 and 5). The second light guide 8 is assembled to the second reflector 9 by attaching the second attached portion 20 to the attachment boss 25a by, for example, screwing and inserting the positioning protrusion 24a into the positioning hole 21a of the second attached portion 21 (see FIG. 3). The second light guide 8 is positioned with respect to the second reflector 9 by inserting the positioning protrusion 24a into the positioning hole 21a.

The first reflector 7 is assembled to the second reflector 9 in a state of covering the second light guide 8 from the front side excluding the portion on the second attached portion 21 side. The attachment bosses 23a and 25c of the second reflector 9 are inserted into the insertion penetrating holes 15a and 16a of the first reflector 7, respectively. In the state where the first reflector 7 is assembled to the second reflector 9, the engagement notches 18 and 18 are positioned near the stepped surfaces 27 and 27, respectively (see FIGS. 6 and 7).

The first light guide 6 is inserted into the first insertion arrangement portion 14 from the front in a state where the end portion of the first light guiding portion 11 on the first light incident surface 11a side is inserted into the insertion hole 16b, and the first light guiding portion 11 is positioned on the inner side of the first insertion arrangement portion 14 (see FIG. 4). The first light guiding portion 11 inserted into the insertion hole 16b is inserted through the relief notch 25d of the second reflector 9 to avoid contact with the second reflector 9.

The engagement protrusions 13 and 13 of the first light guide 6 are respectively inserted into the engagement notches 18 and 18 formed in the first reflector 7 and engaged with side edges of the engagement notches 18 and 18 (see FIGS. 6 and 7). Therefore, the stepped surfaces 27 and 27 are positioned on the lateral side of the engagement protrusions 13 and 13 in the engagement notches 18 and 18, respectively.

The first attached portion 12 of the first light guide 6 is attached to the attachment boss 25c of the second reflector 9 through the insertion penetrating hole 16a by, for example, screwing (see FIG. 3).

In the state where the second light guide 8 is assembled to the second reflector 9 and the first light guide 6 is assembled to the first reflector 7 as described above, the first light guiding portion 11 of the first light guide 6 and the second light guiding portion 19 of the second light guide 8 are positioned in the front-rear direction (see FIG. 4), and the portion of the second light guiding portion 19 on the second attached portion 21 side is exposed frontward on the lateral side of the first light guiding portion 11 (see FIG. 3). Therefore, light is emitted frontward from the portion of the second light guiding portion 19 exposed to the front side without being shielded by the first reflector 7, and this portion is formed as a light emitting portion 31.

The inner lens 10 is positioned with respect to the first reflector 7 by inserting the positioning pin 15b into the positioning hole 29b. The inner lens 10 is attached to the second reflector 9 in a state of being positioned with respect to the first reflector 7 by screw-coupling attachment screws (not illustrated) respectively inserted through the screw insertion penetrating holes 29a and 30a to the attachment boss 23a and the positioning protrusion 24a through the insertion penetrating hole 15a and the positioning hole 21a.

In the state where the inner lens 10 is attached to the second reflector 9, the inner lens 10 covers the first light guide 6 and the second light guide 8 from the front excluding a part of the light guides.

Figure 8:
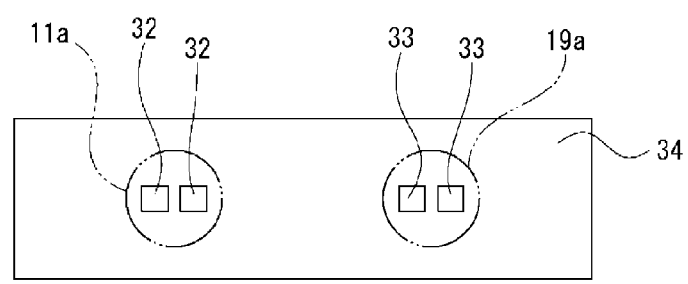
FIG. 8 is an enlarged side view illustrating a light source and a circuit board.

In a state where the lamp unit 5 configured as described above is disposed in the lamp chamber 4a, first light sources 32 and 32 and second light sources 33 and 33 are disposed at positions facing the first light incident surface 11a formed in the first light guiding portion 11 of the first light guide 6 and the second light incident surface 19a formed in the second light guiding portion 19 of the second light guide 8 (see FIG. 8). However, the number of the first light sources 32 and the second light sources 33 disposed to face the first light incident surface 11 and the second light incident surface 19a, respectively, is not limited to two, and the number may be at least one, or three or more.

However, although descriptions have been made on the example in which one end surface of the first light guiding portion 11 in the light guide direction is formed as the first light incident surface 11a, and one end surface of the second light guiding portion 19 in the light guide direction is formed as the second light incident surface 19a, both end surfaces of the first light guiding portion 11 in the light guide direction may be formed as the first light incident surface and the both end surfaces of the second light guiding portion 19 in the light guide direction may be formed as the second light incident surface. In this case, the first light sources are disposed to face the two first light incident surfaces of the first light guiding portion 11, respectively, and the second light sources are disposed to face the two second light incident surfaces of the second light guiding portion 19, respectively.

The first light sources 32 and 32 and the second light sources 33 and 33 are mounted on a circuit board 34. As described above, in the vehicle lamp 1, both the first light source 32 and the second light source 33 are mounted on the circuit board 34 to face the first light incident surface 11a and the second light incident surface 19a, respectively.

Therefore, since both the first light source 32 and the second light source 33 that emit light incident to the different light incident surfaces are mounted on one circuit board 34, it is not required to provide a separate circuit board on which each of the first light sources 32 and 32 and the second light sources 33 and 33 is mounted, and it is possible to reduce the manufacturing cost of the vehicle lamp 1 by reducing the number of components.

Further, in the state where the lamp unit 5 is disposed in the lamp chamber 4a, an extension 35 that shields a part of the lamp unit 5 is disposed in the lamp chamber 4a (see FIGS. 1, 4, and 5). The extension 35 is attached to, for example, an attached portion (not illustrated) provided inside the lamp housing 2, and shields a portion of the lamp unit 5 that is not covered by the inner lens 10 from the front.

In the vehicle lamp 1, when light is emitted from the first light sources 32 and 32, the emitted light is incident from the first light incident surface 11a to the first light guiding portion 11, guided in the first light guiding portion 11, internally reflected by the first reflecting surface 11b, emitted from the first light emitting surface 11c, and irradiated frontward through the inner lens 10 and the cover 3. At this time, a part of the light emitted from the first light guiding portion 11 is reflected by the inner surface of the first insertion arrangement portion 14 of the first reflector 7.

Further, when light is emitted from the second light sources 33 and 33, the emitted light is incident from the second light incident surface 19a to the second light guiding portion 19, guided in the second light guiding portion 19, internally reflected by the second reflecting surface 19b, and emitted from the second light emitting surface 19c. At this time, a part of the light emitted from the second light guiding portion 19 is reflected by the inner surface of the second insertion arrangement portion 22 of the second reflector 9.

When light is emitted from the second light sources 33 and 33 as described above, the light emitted from the portion of the second light guiding portion 19 excluding the light emitting portion 31 is shielded by the first reflector 7, and the light emitted from the light emitting portion 31 is irradiated frontward through the inner lens 10 and the cover 3.

Therefore, in the lamp unit 5, the light emitted from the first light emitting surface 11c formed in the first light guiding portion 11 of the first reflector 7 and the light emitted from the second light emitting surface 11c formed in the light emitting portion 31 of the second reflector 9 are irradiated frontward through the inner lens 10 and the cover 3.

As described above, in the lamp unit 5, light is emitted from the first light guiding portion 11 and the second light guiding portion 19, respectively, and the light emitted from the first light sources 32 and 32 is incident to the first light guiding portion 11 and the light emitted from the second light sources 33 and 33 is incident to the second light guiding portion 19. Therefore, it is possible to set a desired emission state by controlling, for example, the timings of the light emitted from the first light sources 32 and 32 and the light emitted from the second light sources 33 and 33.

For example, by setting the emission timings of the light emitted from the first light sources 32 and 32 and the second light sources 33 and 33 to be different from each other, it is possible to make the light from the first light guiding portion 11 and the second light guiding portion 19 to be emitted with a time lag. Therefore, for example, it is possible to set a so-called sequential light emitting state in which light is visually recognized as a state of flowing from one side to the other side as a whole in the longitudinal direction of the first light guiding portion 11 and the second light guiding portion 19.

Further, by setting light emitting brightness of the light emitted from the first light sources 32 and 32 and the second light sources 33 and 33 to be different from each other, it is also possible to change the brightness of the light emitted from the first light guiding portion 11 and the second light guiding portion 19.

Furthermore, by performing turn-ON/OFF control of the light emitted from the first light sources 32 and 32 and the second light sources 33 and 33, it is possible to set the light to be irradiated frontward in a blinking state. In this case, by setting the timings of the turn-ON/OFF of the light emitted from the first light sources 32 and 32 and the second light sources 33 and 33 to be different from each other, it is also possible to increase the degree of freedom of the light emitting state.

Figure 9:
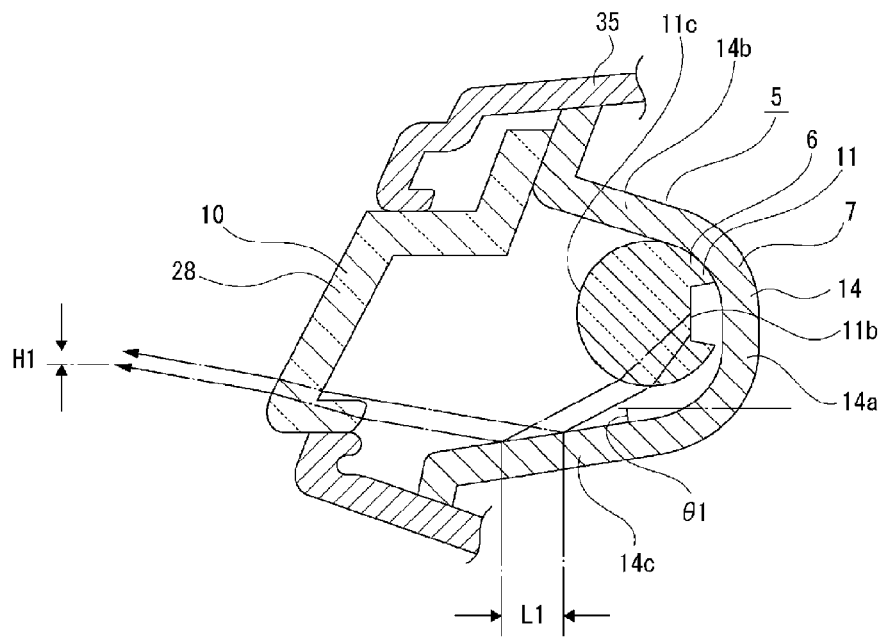
FIG. 9 is a view for explaining control of light with respect to the first light guide.

Further, in the vehicle lamp 1, it is possible to control a light emitting width of the light emitted from the first light emitting surface 11c using a relationship between the position of the first light guide 6 with respect to the first insertion arrangement portion 14 and an inclination angle of the lower inclined surface portion 14c of the first insertion arrangement portion 14 that functions as a reflection control surface (see FIG. 9). Further, it is possible to control a light emitting width of the light emitted from the second light emitting surface 19c using a relationship between the position of the second light guide 8 with respect to the second insertion arrangement portion 22 and an inclination angle of the lower inclined surface portion 22c of the second insertion arrangement portion 22 that functions as a reflection control surface (see FIG. 10).

For example, by setting the position of the first light guide 6 with respect to the first insertion arrangement portion 14, in particular, the position of the front-rear direction (depth direction) to a predetermined position, and setting the inclination angle of the lower inclined surface portion 14c of the first insertion arrangement portion 14 to a predetermined angle, it is possible to set a vertical light emitting width H1 of the light reflected by the lower inclined surface portion 14c and directed frontward to a desired width (see FIG. 9). At this time, the light reflected by the first reflecting surface 11b and emitted toward the lower inclined surface portion 14c from the first light emitting surface 11c is reflected by the lower inclined surface portion 14c with a predetermined front-rear width L1, and irradiated frontward with the vertical light emitting width H1.

Therefore by setting the position of the first light guide 6 with respect to the first insertion arrangement portion 14 to a predetermined position, and setting the angle of the lower inclined surface portion 14c of the first insertion arrangement portion 14 with respect to the horizontal surface to an inclination angle θ1 that reflects with the front-rear width L1, it is possible to irradiate light frontward with the light emitting width H1.

Figure 10:
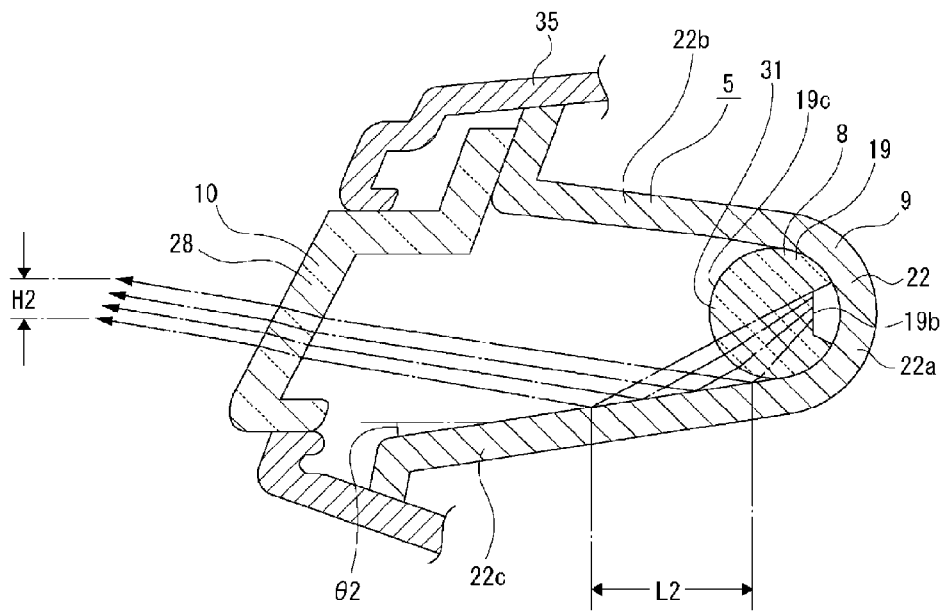
FIG. 10 is a view for explaining control of light with respect to the second light guide.

Further, for example, it is possible to set a vertical light emitting width H2 of the light reflected by the lower inclined surface portion 22c and directed frontward to a desired width by setting the position of the second light guide 8 with respect to the second insertion arrangement portion 22, in particular, the position of the front-rear direction (depth direction) to a predetermined position, and setting the inclination angle of the lower inclined surface portion 22c of the second insertion arrangement portion 22 to a predetermined angle (see FIG. 10). At this time, the light reflected by the second reflecting surface 19b and emitted toward the lower inclined surface portion 22c from the second light emitting surface 19c is reflected by the lower inclined surface portion 22c with a predetermined front-rear width L2, and irradiated frontward with the vertical light emitting width H2.

Therefore, by setting the position of the second light guide 6 with respect to the second insertion arrangement portion 22 to a predetermined position, and setting the angle of the lower inclined surface portion 22c of the second insertion arrangement portion 22 with respect to the horizontal surface to an inclination angle θ2 that reflects with the front-rear width L2 it is possible to irradiate light frontward with the light emitting width H2.

As described above, by setting the positions of the first light guide 6 and the second light guide 8 and the inclination angles of the lower inclined surface portions 14c and 22c, it is possible to irradiate light with the required light emitting widths H1 and H2, respectively. In such settings, the inclination angles of the lower inclination surface portions 14c and 22c may be changed in the left-right direction, and the inclination angles of the lower inclination surface portions 14c and 22c may be the same in the left-right direction. Further, the inclination angles of the lower inclination surface portion 14c and the lower inclination surface portion 22c may be different from each other or be the same with each other.

Further, in the configuration described above, by changing the position of the first light guide 6 in the front-rear direction with respect to the first insertion arrangement portion 14 and the position of the second light guide 8 in the front-rear direction with respect to the second insertion arrangement portion 22, it is possible to change the amount of light respectively irradiated frontward, and to promote the improvement of the degree of freedom of the control related to the amount of light.

With the setting of the positions of the first light guide 6 and the second light guide 8, and the setting of the inclination angles of the lower inclination surface portions 14c and 22c, it is possible to promote the improvement of the degree of freedom of the light respectively emitted from the first light guide 6 and the second light guide 8.

As disclosed above, in the vehicle lamp 1, the first light guiding portion 11 and the second light guiding portion 19 are disposed on the opposite sides across the first reflector 7, the first light guiding portion 11 is positioned on the light emitting direction side of the second light guiding portion 19, and a part of the second light guiding portion 19 is positioned outside the first light guiding portion 11 in the light guide direction.

Therefore, the first light guiding portion 11 and the second light guiding portion 19 are disposed on the opposite sides across the first reflector 7 in the state where the first light guiding portion 11 is positioned on the light emitting direction side of the second light guiding portion 19, and a part of the second light guiding portion 19 is positioned outside the first light guiding portion 11 in the light guide direction. Therefore, it is possible to separately control the light emitted from the first light emitting surface 11c and the light emitted from the second light emitting surface 22c to be continuously or intermittently irradiated, and to promote the improvement of functionality by diversifying the light irradiation state. In particular, the first light guiding portion 11 and the second light guiding portion 19 are disposed on the opposite sides in the light emitting direction across the first reflector 7, and thus, it is possible to emit light from the first light guiding portion 11 and the second light guiding portion 19 in the same direction. In addition, it is possible to promote the improvement of functionality by diversifying the light irradiation state after promoting the improvement of brightness.

Further, the vehicle lamp 1 is configured to cause light to be incident from the first light incident surface 11a formed on one end surface of the first light guiding portion 11 and the second light incident surface 19a formed on one end surface of the second light guiding portion 19 to irradiate the light frontward by internal reflection. Therefore, it is different from a configuration in which a plurality of light sources are arranged in the longitudinal direction on the back surface side of a transparent body extending in a predetermined direction, and for example, the sequential light emitting is performed by turning on with a sequential time lag.

Therefore, in the vehicle lamp 1, the inconvenience of reduced light uniformity due to the decrease in brightness between the light sources occurred in the configuration in which light is emitted from the light sources arranged side by side on the back surface side of the transparent body hardly occurs, and a good light emitting state by the improvement of the light uniformity may be secured.

Further, since the first reflector 7 that reflects a part of the light emitted from the first light emitting surface 11a, a part of the light guided in the first light guiding portion 11 is reflected by the first reflector 7, and light leakage is suppressed in the first light guide 6, thereby promoting the improvement of brightness.

Furthermore, since the second reflector 9 that reflects a part of the light emitted from the second light emitting surface 22a, a part of the light guided in the second light guiding portion 19 is reflected by the second reflector 9, and light leakage is suppressed in the second light guide 8, thereby promoting the improvement of brightness.

Further, the engagement protrusions 13 and 13 that protrude from the first light guiding portion 11 and are engaged with a part of the first reflector 7 are provided in the first light guide 6, and the engagement protrusions 13 and 13 protrude from positions other than the first light emitting surface 11c.

Therefore, the first light guide 6 is held by the first reflector 7 by the engagement of the engagement protrusions 13 and 13 with a part of the first reflector 7, and the light emitted from the first light emitting surface 11c is not directed to the engagement protrusions 13 and 13, so that the engagement protrusions 13 and 13 do not interfere with the progress of the light emitted from the first light emitting surface 11c. Therefore, the portions where the engagement protrusions 13 and 13 are provided do not become dark portions, and a stable holding state of the first light guide 6 with respect to the first reflector 7 may be secured after securing a good emitting state of the light emitted from the first light emitting surface 11c.

Additionally, the engagement protrusions 13 and 13 protrude from one end portion of the first light guiding portion 11 in the light guide direction, and the engagement protrusions 13 and 13 that protrude from one end portion of the first light guiding portion 11 in the longitudinal direction are engaged with a part of the first reflector 7, and thus, a stable holding state of the first light guide 6 by the first reflector 7 may be secured.

However, in the above, although descriptions have been made on the example in which the two light guides of the first light guide 6 and the second light guide 8 are positioned side by side in the front-rear direction, for example, three or more light guides may be positioned side by side in the front-rear direction. In this case, reflectors may be disposed between the three or more light guides in the front-rear direction, respectively, and a part of the light guide positioned on the inner side may be positioned outside the light guide positioned on the front side in the light guide direction.

DESCRIPTION OF SYMBOLS

1: vehicle lamp
6: first light guide
7: first reflector
8: second light guide
9: second reflector
11: light guiding portion
11a: incident surface
11c: emitting surface
13: engagement protrusion
19: second light guiding portion
19a: incident surface
32: first light source
33: second light source
34: circuit board

What is claimed is:

1. A vehicle lamp comprising:
   a first light guide including a first light guiding portion having a first light emitting surface formed thereon and a first light incident surface formed at least one end in a light guide direction;
   a second light guide including a second light guiding portion having a second light emitting surface formed thereon and a second light incident surface formed at least one end in a light guide direction; and
   a first reflector configured to reflect a part of light emitted from the first light emitting surface,
   wherein the first light guiding portion and the second light guiding portion are disposed on opposite sides across the first reflector,
   the first light guiding portion is positioned on a light emitting direction side of the second light guiding portion, and
   a part of the second light guiding portion is positioned outside the first light guiding portion in the light guide direction.

2. The vehicle lamp according to claim 1, further comprising:
   a second reflector configured to reflect a part of light emitted from the second light emitting surface.

3. The vehicle lamp according to claim 1, wherein a first light source is disposed to face the first light incident surface,
   a second light source is disposed to face the second light incident surface, and
   the first light source and the second light source are mounted on a same circuit board.

4. The vehicle lamp according to claim 1, wherein the first light guide is provided with an engagement protrusion protruding from the first light guiding portion and engaged with a part of the first reflector, and
   the engagement protrusion protrudes from a position other than the first light emitting surface.

5. The vehicle lamp according to claim 4, wherein the engagement protrusion protrudes from one end portion of the first light guiding portion in the light guide direction.

* * * * *